United States Patent
Kangas et al.

(10) Patent No.: US 7,239,112 B2
(45) Date of Patent: *Jul. 3, 2007

(54) BATTERY OVERCHARGING COMPENSATION SYSTEM AND METHOD

(75) Inventors: P. Daniel Kangas, Cary, NC (US); Toshiro Hiromitsu, Fujisawa (JP); Seiichi Idei, Machida (JP)

(73) Assignee: International Business Machines Corporation, Armonk, NY (US)

( * ) Notice: Subject to any disclaimer, the term of this patent is extended or adjusted under 35 U.S.C. 154(b) by 444 days.

This patent is subject to a terminal disclaimer.

(21) Appl. No.: 10/842,182

(22) Filed: May 10, 2004

(65) Prior Publication Data

US 2005/0248316 A1    Nov. 10, 2005

(51) Int. Cl.
*H02J 7/00* (2006.01)

(52) U.S. Cl. .................. 320/134; 320/156

(58) Field of Classification Search ........... 320/156, 320/134, 132, 148, 161
See application file for complete search history.

(56) References Cited

U.S. PATENT DOCUMENTS 4,392,101 A * 7/1983 Saar et al. .................. 320/156
5,600,226 A * 2/1997 Falcon ....................... 320/129
2005/0200332 A1* 9/2005 Kangas et al. ............. 320/128

* cited by examiner

*Primary Examiner*—Karl Easthom
*Assistant Examiner*—Aaron Piggush
(74) *Attorney, Agent, or Firm*—Duke W. Yee; Mark E. McBurney; Peter B. Manzo

(57) ABSTRACT

A method for compensating for overcharging of at least one battery includes calculating a charge rate for the at least one battery, comparing an overcharge accumulator value for the at least one battery with a maximum time limit value, comparing the calculated charge rate with a nominal charge rate for the at least one battery, if the overcharge accumulator value is less than the maximum time limit value, incrementing the overcharge accumulator value if the calculated charge rate is higher than the nominal charge rate, if the overcharge accumulator value is less than the maximum time limit value, decrementing the overcharge accumulator value if the calculated charge rate is lower than the nominal charge rate (if the overcharge accumulator value is less than the maximum time limit value), setting the charge rate for the at least one battery to the calculated charge rate (if the overcharge accumulator value is less than the maximum time limit value), and setting the charge rate for the at least one battery to the nominal charge rate, or to a charge rate lower than the nominal charge rate, if the overcharge accumulator value equals or exceeds the maximum time limit value. In this manner, battery life may be prolonged.

4 Claims, 7 Drawing Sheets

Table 1: Example of Calculated Peak Charge Schedule

| Battery ID or S/N | Battery Charge Level | Battery's Priority Rating | Battery's Charge Rate |
|---|---|---|---|
| 8 | 95% | 1 | 1.0C |
| 5 | 80% | 1 | 1.0C |
| 7 | 40% | 1 | 1.0C |
| 1 | 20% | 1 | 0.7C |
| 6 | 10% | 1 | 0.7C |
| 9 | 5% | 1 | 0.7C |
| 3 | 90% | 2 | 0.5C |
| 2 | 60% | 2 | 0.5C |
| 4 | 85% | 3 | 0.5C |

Table 2: Example of Calculated Off-Peak Charge Schedule

| Battery ID or S/N | Battery Charge Level | Est. Time to Good-Charge | Adjusted Charge Rate | Adj. Time to Good-Charge |
|---|---|---|---|---|
| 8 | 95% | 0.7 hours | 0.5C | 1.0 hour |
| 5 | 80% | 2.8 hours | 0.5C | 4.0 hours |
| 7 | 40% | 8.5 hours | 0.7C | 8.5 hours |
| 1 | 20% | 11.4 hours | 0.7C | 11.4 hours |
| 6 | 10% | 12.7 hours | 0.7C | 12.7 hours |
| 9 | 5% | 13.5 hours | 0.7C | 13.5 hours |
| 3 | 90% | 1.4 hours | 0.5C | 2 hours |
| 2 | 60% | 5.7 hours | 0.5C | 8 hours |
| 4 | 85% | 2.1 hours | 0.5C | 3 hours |

FIG. 6

BATTERY OVERCHARGING COMPENSATION SYSTEM AND METHOD

FIELD OF THE INVENTION

The present invention relates to the charging of batteries, and more particularly to the intelligent charging of multiple batteries and for compensating for overcharging of at least one battery.

BACKGROUND OF THE INVENTION

Multiple battery charging stations for rechargeable batteries are known in the art. It is common for batteries to be placed in the charging station with varying charge levels still in the batteries. The time required for each battery to be charged again to a useful level is thus also variable. However, many early conventional charging stations charge all of the batteries at the standard or nominal charge rate at the same time. Thus, batteries closer to their useful charge level can be overcharged, affecting the battery's life. However, to avoid overcharging these batteries, the batteries farther from their useful charge level are undercharged, limiting the time they can power a device.

One conventional approach to this problem is to charge the batteries with the lowest charge level first or at a higher charge rate than the other batteries, until all of the batteries are at the same charge level. Then, all of the batteries are charged at the same charge rate. However, with this approach, even if one of the batteries is close to its useful charge level, a user must still wait until the charge levels of the other batteries "catch up", before a battery is available for use.

In addition, multiple battery charging stations can result in power distribution and thermal problems. Some conventional charging stations provide maximum continuous charge to all batteries, whether or not it is required at a particular time. This places a large demand on the charging station's power supply. In stations with a large number of batteries, the power required can exceed the AC line current capacity.

Accordingly, there exists a need for an improved method for multiple battery charge control. The method should prioritize the charging of the batteries depending on the status of the battery. It should decrease the time required for at least some of the batteries to be at a desired charge level and available for use as quickly as possible. It should also assist in preserving battery life and manage the charge rates so that the power required by the charging station does not exceed the AC line current capacity. The present invention addresses such a need.

SUMMARY OF THE INVENTION

A method for compensating for overcharging of at least one battery includes calculating a charge rate for the at least one battery, comparing an overcharge accumulator value for the at least one battery with a maximum time limit value, comparing the calculated charge rate with a nominal charge rate for the at least one battery, if the overcharge accumulator value is less than the maximum time limit value, incrementing the overcharge accumulator value if the calculated charge rate is higher than the nominal charge rate, if the overcharge accumulator value is less than the maximum time limit value, decrementing the overcharge accumulator value if the calculated charge rate is lower than the nominal charge rate (if the overcharge accumulator value is less than the maximum time limit value), setting the charge rate for the at least one battery to the calculated charge rate (if the overcharge accumulator value is less than the maximum time limit value), and setting the charge rate for the at least one battery to the nominal charge rate, or to a charge rate lower than the nominal charge rate, if the overcharge accumulator value equals or exceeds the maximum time limit value. In this manner, battery life may be prolonged.

BRIEF DESCRIPTION OF THE FIGURES

FIG. 6 illustrates examples calculated peak and off-peak charge schedules in accordance with the present invention.

DETAILED DESCRIPTION

The present invention provides an improved method for multiple battery charge control. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

In the method in accordance with the present invention, when a plurality of batteries are to be charged for a peak usage time period, a priority rating for each of the batteries is determined based upon at least one parameter. The parameter comprises a closeness to a desired charge level. A battery closer to the desired charge level is given a higher priority rating. The batteries are then charged according to their priority ratings. When the plurality of batteries is to be charged for an off-peak usage time period, the method adjusts the charge rates of the batteries based upon the parameter and the available time for the charge.

To more particularly describe the features of the present invention, please refer to FIGS. 1 through 7 in conjunction with the discussion below.

Figure 1:
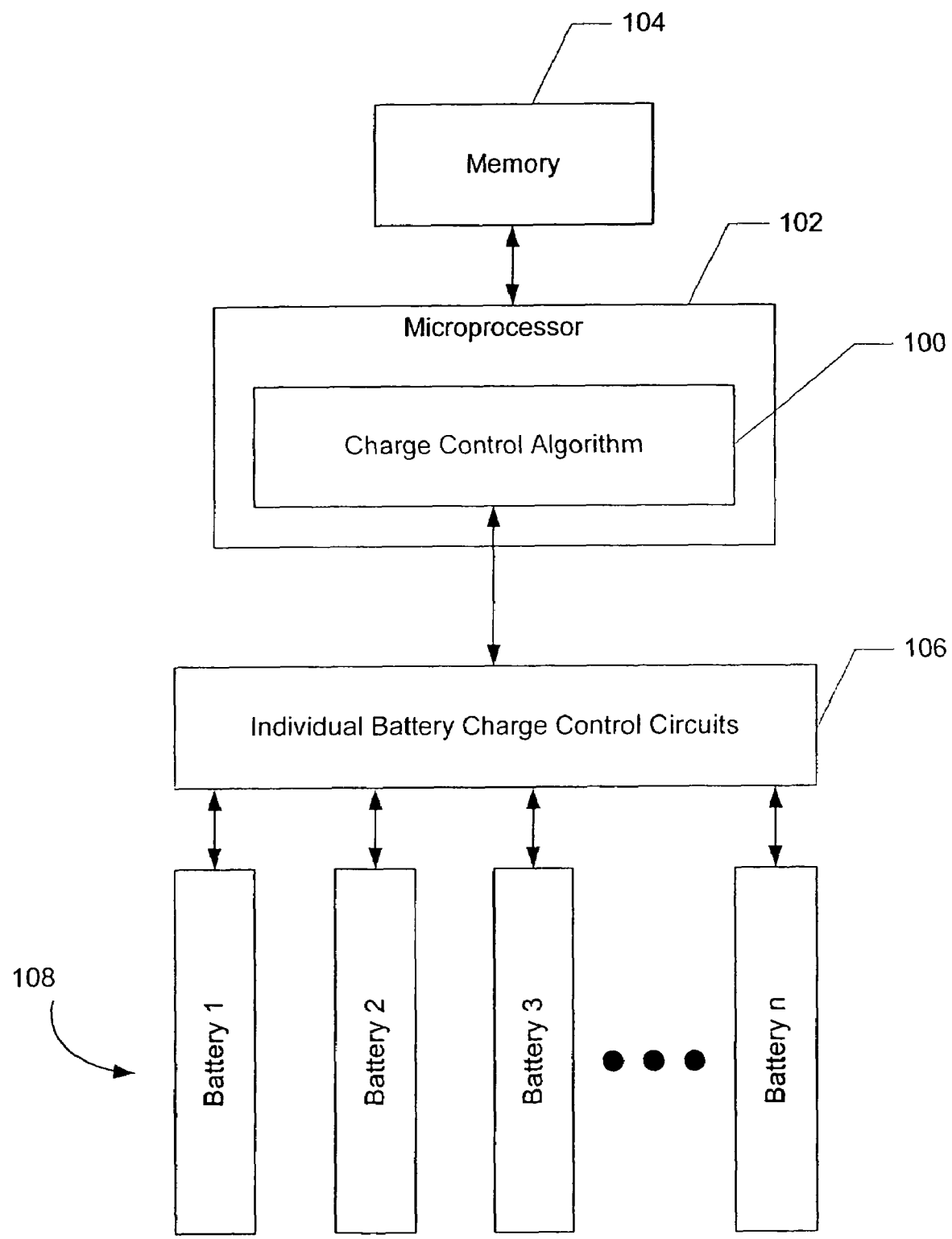
FIG. 1 illustrates a preferred embodiment of a system utilizing the method for battery charge control in accordance with the present invention.

FIG. 1 illustrates a preferred embodiment of a system utilizing the method for battery charge control in accordance with the present invention. The system comprises a charge control algorithm 100, a microprocessor 102, and a memory 104. In the preferred embodiment, the charge control algorithm 100 is software executed by the microprocessor 102, utilizing the memory 104 in a manner known in the art. The charge control algorithm 100 implements the method for battery charge control in accordance with the present invention, as described further below with reference to FIG. 2.

The charge control algorithm 100 individually controls the charging of a plurality of batteries 108 via an individual battery charge control circuits 106. The circuits 106 can be a single charge integrated circuit (IC) or several charge IC's replicated across the battery positions. The circuits 106 can also be a single control circuit that regulates the current to the batteries 108 on an individual basis.

The charge control algorithm 100 can reside in a computer system to which the mechanism 106 is directly coupled, in a network computer system to which the mechanism 106 is coupled through a network, or in a battery charging station itself. The mechanism 106 can be an integrated part of a computer system or portable device, such as a laptop computer, cellular phone, or personal digital assistant. One of ordinary skill in the art will understand that the charge control algorithm 100 can reside within other types of devices without departing from the spirit and scope of the present invention.

Figure 2:
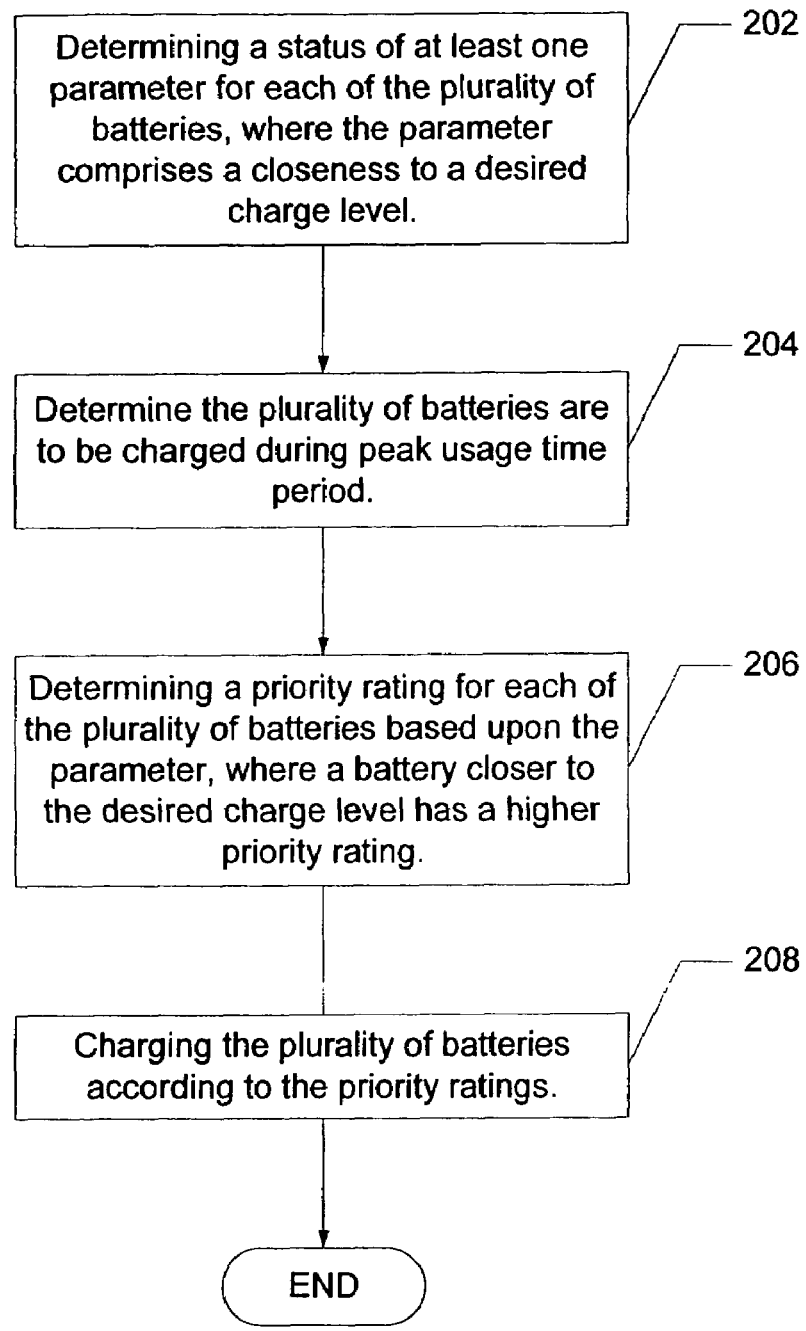
FIG. 2 is a flowchart illustrating a preferred embodiment of the method for multiple battery charge control in accordance with the present invention.

FIG. 2 is a flowchart illustrating a preferred embodiment of the method for multiple battery charge control in accordance with the present invention. First, a status of at least one parameter for each of the plurality of batteries 108 is determined, via step 202. A parameter can be a closeness to a desired charge level for a battery. The desired charge level need not be the full charge level of the battery, as a battery need not be fully charged to be useful. In this specification, the desired charge level will be referred to as a "good-charge" level. The good-charge level is arbitrary and changeable. In the preferred embodiment, any charge level above that at which a battery is usable can be set as the good-charge level. Thus, this parameter relates to how close the current charge level of each battery is to the good-charge level.

Next, it is determined that the plurality of batteries 108 are to be charged for a peak usage time period, via step 204. A "peak usage time period", as used in this specification, refers to a time of day during which the batteries 108 are to be used to power devices. For example, if the batteries 108 are for devices used by customers and/or employees of a business, the peak usage time period can be the normal business hours. An "off-peak usage time period", then, would be the remainder of the day, such as the hours during which the business is closed, when the batteries 108 are not to be used. The method for the off-peak usage time period will be described further below with reference to FIG. 5.

Once it is determined that the plurality of batteries 108 are to be charged for a peak usage time period, a priority rating is determined for each of the plurality of batteries 108 based upon the parameter. When the parameter is the closeness to the desired or good-charge level, batteries closer to the good-charge level are given higher priority ratings, via step 206. Then, the plurality of batteries 108 is charged according to the priority ratings, via step 208. The batteries with the higher priority ratings are either charged first or at a higher charge rate. Once these batteries 108 are charged to the good-charge level, they can be used. Any number of mechanisms can be used to signal that these batteries can now be used. For example, a light emitting diode (LED) can be used to signal a user, or an electronic signal can be used to signal a host computer. Other types of signaling mechanisms can also be used. The remaining batteries can continue to be charged until they also reach the good-charge level. By charging the batteries 108 based on these priority ratings, the higher priority batteries need not wait for the lower priority batteries to "catch up" before they are charged. A length of time a user must wait for a battery to reach a useful charge level is shortened. In addition, the lower charge rates for lower priority batteries prolong the lower priority batteries' lifetimes.

Other parameters can also be used to determined the priority ratings of the batteries 108. For example, the parameters can also include the battery's ID or serial number (S/N), the battery's part number or amp-hour rating, the type of device the battery would be or is powering, or the type of user that would be using the battery. The amp-hour rating of the battery specifies the battery charge current for the battery. For example, a rate of 1.0 C for a 2 amp-hour battery cell is 2 amps of charge current. A nominal charge rate for a battery is specified by the battery technology and manufacturer. For example, a lithium ion battery has a recommended charge rate of 70% of the amp-hour rating or 0.7 C. For the type of device parameter, a battery for powering a high use device may be given a higher priority rating than one for powering a device rarely used. For the type of user parameter, such as in a retail or commercial environment, a battery for powering a device used by a customer may be given a higher priority rating than one for powering a device used by an employee. These and other parameters may be used in any combination to determine the priority ratings of the batteries 108.

In the preferred embodiment, smart batteries are used. Smart batteries communicate the values of the parameters via a standard communication channel, e.g. I2C, USB, etc. These standard communication channels are known in the art and will not be further described here. Other means of communicating the values of the parameters may be used without departing from the spirit and scope of the present invention.

Although the preferred embodiment has been described above in the context of charging multiple batteries, one of ordinary skill in the art will understand that the manner in which a charge rate is determined can be applied to the charging of a single battery without departing from the spirit and scope of the present invention.

Figure 3:
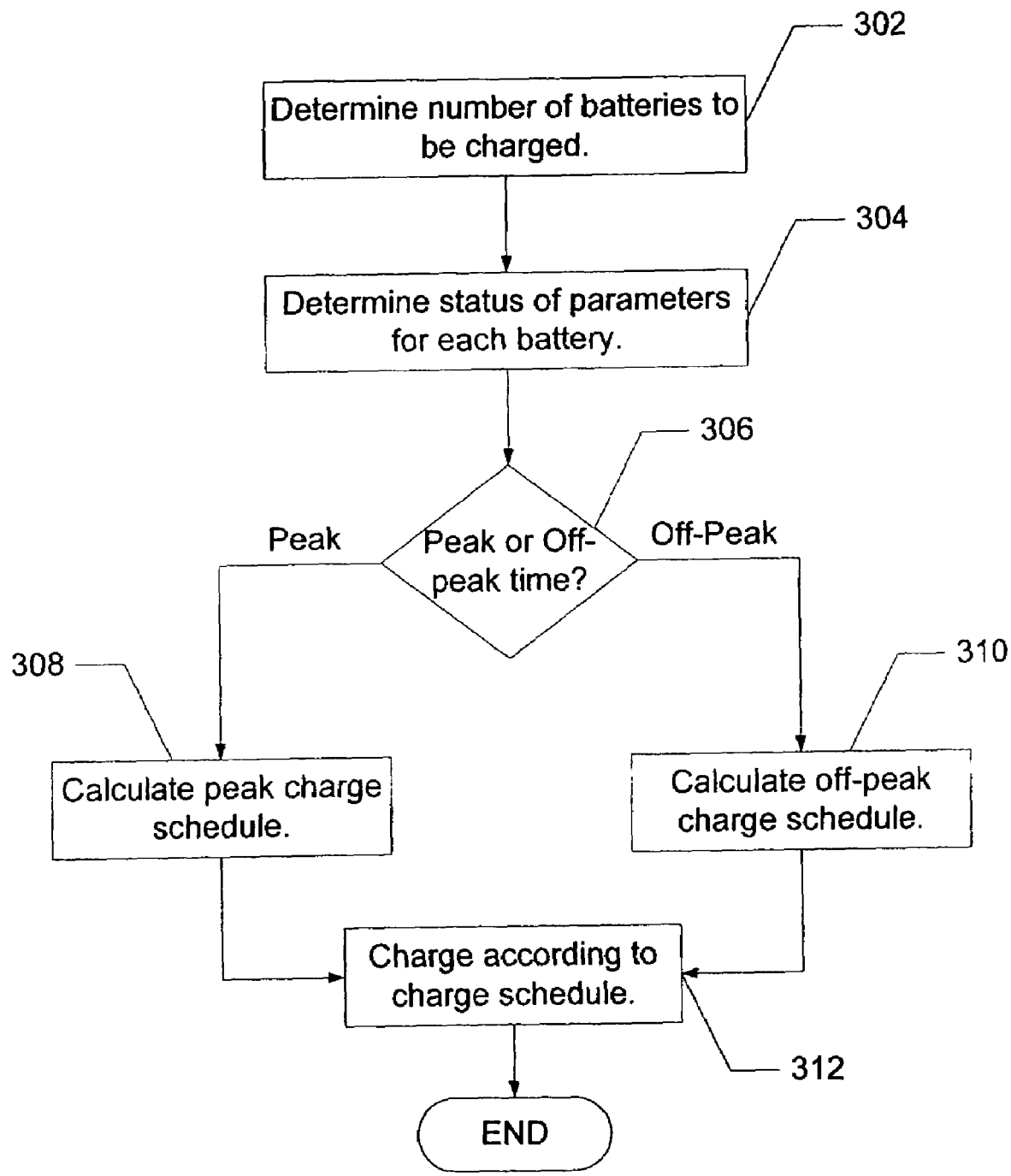
FIG. 3 is a flowchart illustrating in more detail the preferred embodiment of the method for multiple battery charge control in accordance with the present invention.

FIG. 3 is a flowchart illustrating in more detail the preferred embodiment of the method for multiple battery charge control in accordance with the present invention. First, the number of batteries to be charged is determined, via step 302. Next, the status of the parameters for each battery is determined, via step 304. Then, it is determined whether the charge is occurring during peak or off-peak usage time periods, via step 306. If the time of day is a peak usage time period, then a peak charge schedule is calculated, via step 308. If the time of day is an off-peak usage time period, then an off-peak charge schedule is calculated, via step 310. Once the charge schedule is calculated, the batteries 108 are charged according to this schedule, via step 312.

Figure 4:
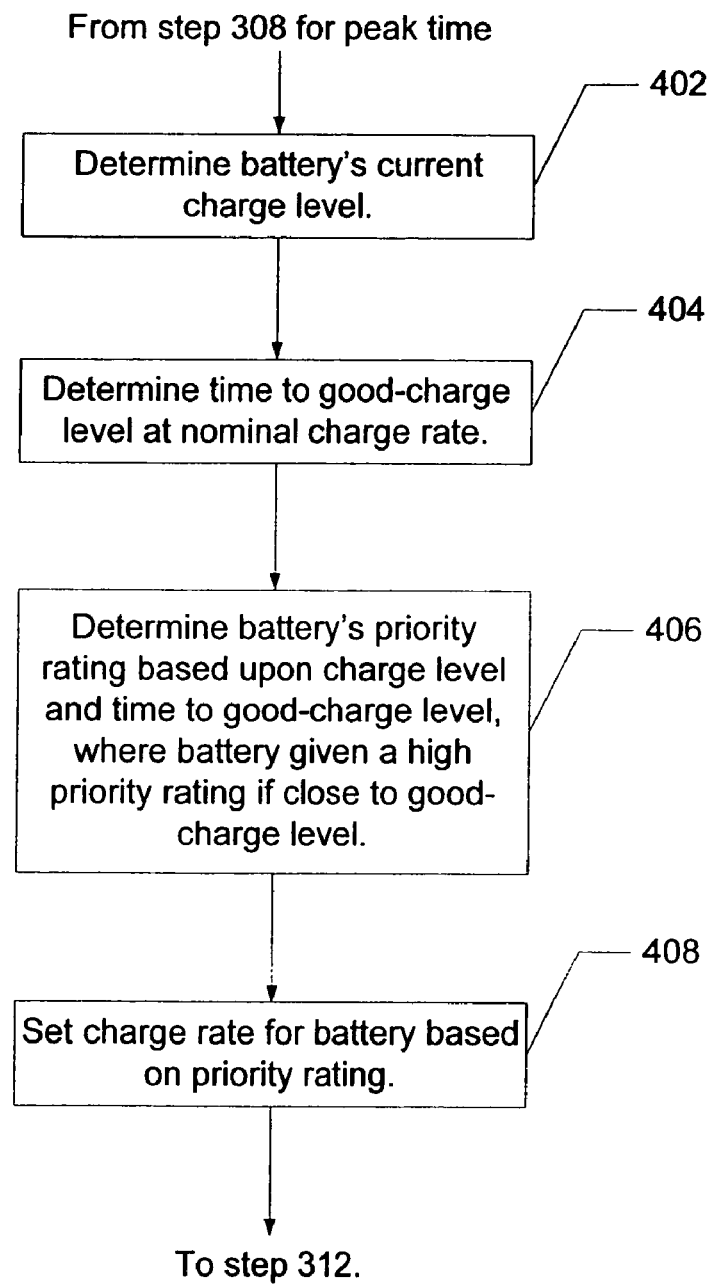
FIG. 4 is a flowchart illustrating in more detail the calculation of the peak charge schedule in the preferred embodiment of the method for multiple battery charge control in accordance with the present invention.

FIG. 4 is a flowchart illustrating in more detail the calculation of the peak charge schedule in the preferred embodiment of the method for multiple battery charge control in accordance with the present invention. For each battery to be charged, steps 402 through 406 are performed. First, the current charge level of a battery to be charged is determined, via step 402. The charge time to the good-charge level for the battery at the battery's nominal charge rate is then determined, via step 404. Based at least upon the current charge level and the charge time to the good-charge level, the priority rating for the battery is determined, via step 406. For example, a battery is given a high priority rating if its current charge level is close to the good-charge level. Other parameters or combination of parameters may also be used in determining the priority ratings, as described previously. Then, the charge rate for the battery is set based on its priority rating, via step 408. The priority rating values can be stored in a memory location on the battery or in a look-up table in the algorithm 100 or software.

FIG. 6 illustrates in Table 1 an example of a calculated peak charge schedule in accordance with the present invention. In this example, there are nine batteries to be charged. The batteries are prioritized according to the steps in FIG. 4. The charge rates for the batteries are then set based on their priority ratings. The top three highest priority batteries (#8, #5, and #7) receive the highest charge of 1.0 C. The next highest priority rated batteries (#1, #6, and #9) receive a lower charge rate of 0.7 C. The lowest priority rated batteries (#3, #2, and #4) received the lower charge rate of 0.5 C.

In addition to ensuring that at least one or more of the batteries will reach the good-charge level in the shortest possible interval, the lower charge rates for the lower rated batteries help to balance the power demands on a charging station's power supply. The peak charge schedule can be calculated such that the maximum capacity of the charging station's power supply is not exceeded.

Figure 5:
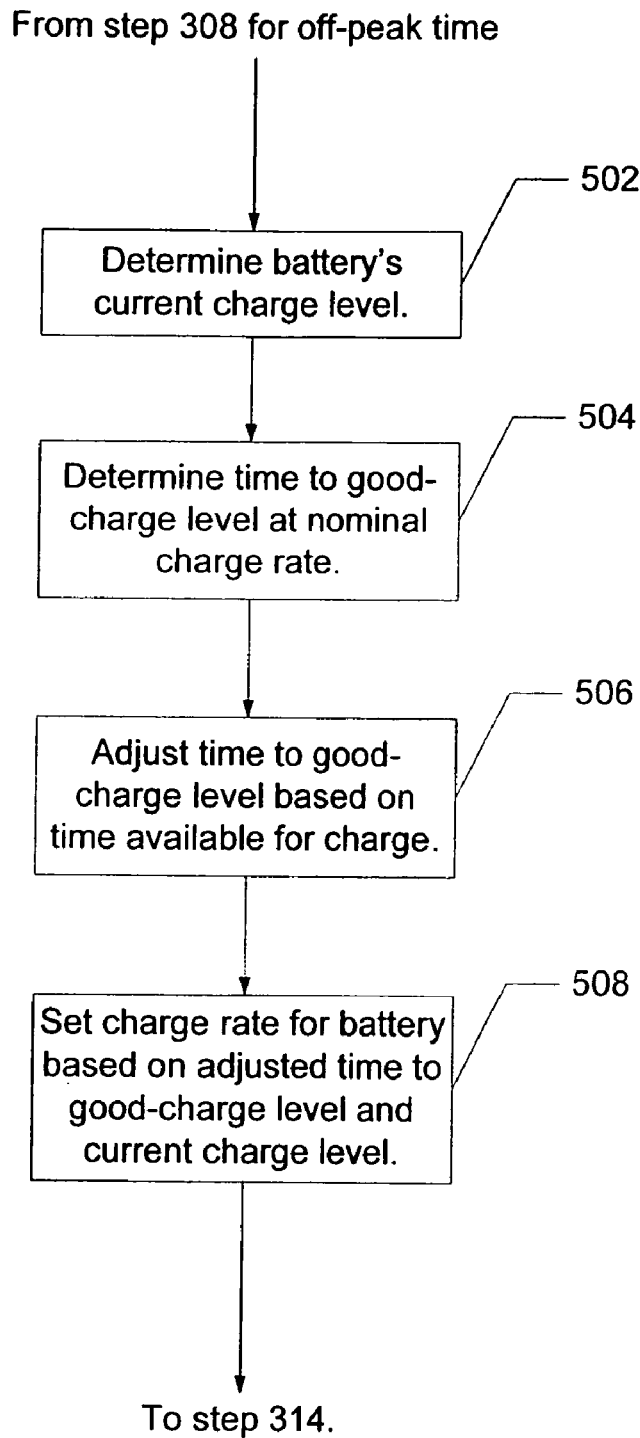
FIG. 5 is a flowchart illustrating in more detail the calculation of the off-peak charge schedule in the preferred embodiment of the method for multiple battery charge control in accordance with the present invention.

FIG. 5 is a flowchart illustrating in more detail the calculation of the off-peak charge schedule in the preferred embodiment of the method for multiple battery charge control in accordance with the present invention. For each battery to be charged, steps 502 through 508 are performed. First, a current charge level for a battery to be charged is determined, via step 502. Next, the charge time to the good-charge level at the battery's nominal charge rate is determined, via step 504. However, since the charging is to take place during the off-peak usage time period, there is a longer available length of time in which to charge the battery than during the peak usage time period. Lower charge rates may then be used, helping to prolong the life of the batteries. Based upon the actual time available for the charge, the charge time to good-charge level is adjusted, via step 506. The charge rate for the battery is then set based at least on the adjusted charge time to the good-charge level and the battery's current charge level, via step 508.

FIG. 6 illustrates in Table 2 an example of a calculated off-peak charge schedule in accordance with the present invention. In this example, there are nine batteries to be charged. Assume that the off-peak usage time period is 10 hours in duration. Some batteries (#8, #5, #3, #2, and #4) have a current charge level and capacity sufficient to achieve the good-charge level within 10 hours at a lower than nominal rate of 0.5 C. Another battery (#7) has the charge level and capacity that they can achieve the good-charge level within the 10 hours at the nominal charge rate of 0.7 C. Some batteries (#1, #6, and #9) cannot achieve the good-charge level within the 10 hours at the nominal charge rate of 0.7 C. These batteries may be charged at a higher than nominal charge rate, if the AC power current capacity is not exceeded. Alternatively, these batteries can be charged for longer than 10 hours at the nominal or lower charge rate.

As described above, the adjusted charge rates for the batteries can be the nominal charge rate, higher than the nominal charge rate, or lower than the nominal charge rate, depending on the parameters for the batteries. However, a higher than nominal charge rate can degrade a battery's ability to hold full charge. Thus, an algorithm to compensate for times at which a battery is overcharged, i.e., at a charge rate higher than the nominal rate, is advantageous in maintaining or prolonging the rated life of the battery.

Figure 7:
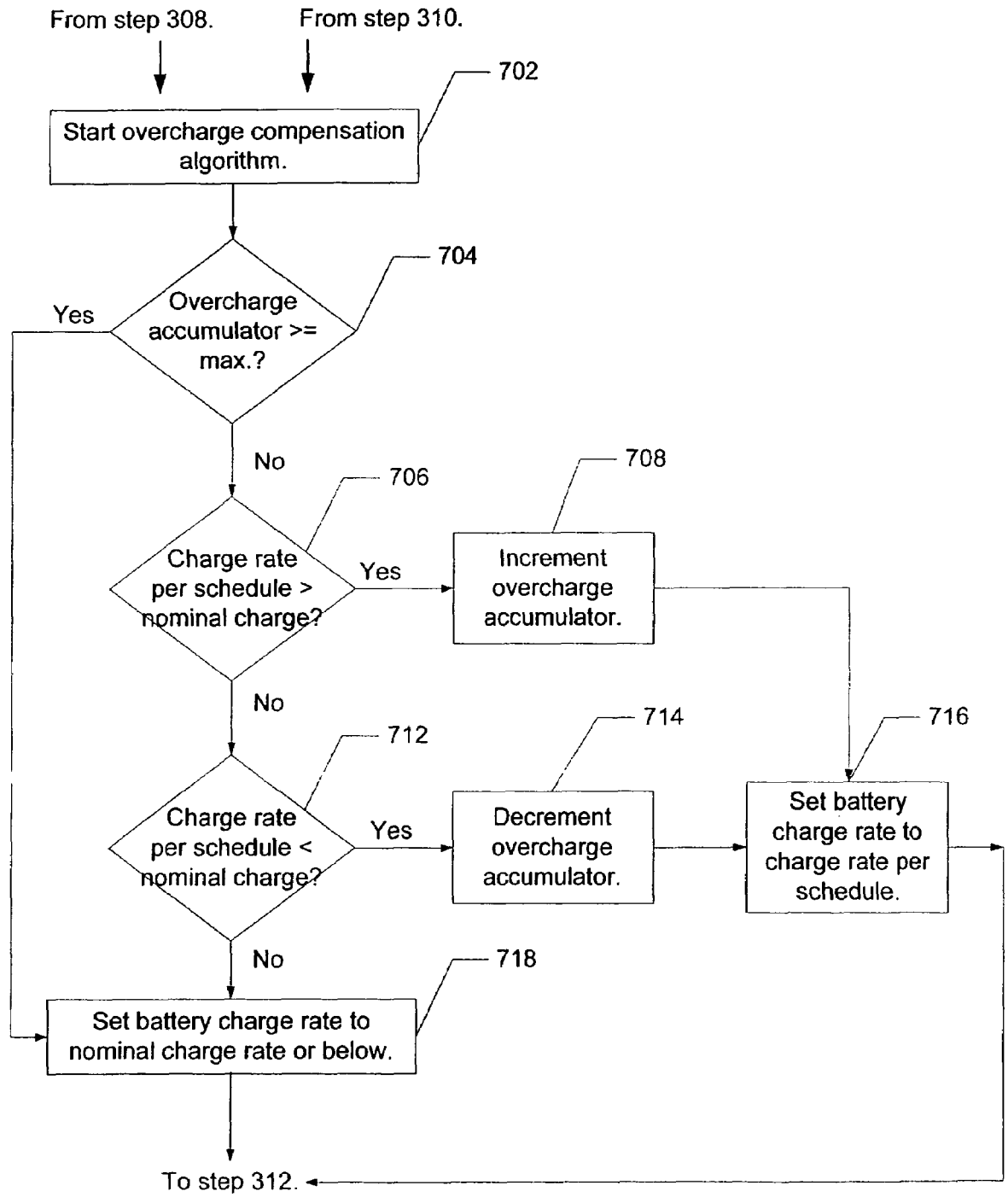
FIG. 7 is a flowchart illustrating an overcharge compensation algorithm for the preferred embodiment of the method for multiple battery charge control in accordance with the present invention.

FIG. 7 is a flowchart illustrating an overcharge compensation algorithm for the preferred embodiment of the method for multiple battery charge control in accordance with the present invention. In this algorithm, an overcharge accumulator value records the amount of time a battery experiences a charge rate over its nominal charge rate. To start the overcharge compensation algorithm, via step 702, the overcharge accumulator value for the battery is compared with the maximum time limit value, via step 704. An acceptable maximum time limit value can be determined as a trade-off between a faster charging time and a longer battery life. If the maximum time limit value has not been reached, then the battery's charge rate per the calculated peak or off-peak charge schedule is compared with the battery's nominal charge rate, via step 706. If the charge rate per the schedule is higher than the nominal charge rate, then the battery's overcharge accumulator value is incremented, via step 708. If it is determined that the charge rate is lower than the nominal charge rate, via step 712, then the battery's overcharge accumulator value is decremented, via step 714. The battery's charge rate is then set to the charge rate per the schedule, via step 716. Otherwise, the battery's charge rate is set to the nominal charge rate, via step 718. When the battery's overcharge accumulator value has reached the maximum time limit value, via step 704, then the battery charge rate is set to the nominal charge rate or below, via step 718, even if the charge rate per the schedule is a higher than nominal charge rate. Overcharging the battery in this situation is thus avoided. Non-linear compensation may be required. The undercharge duration may need to be set at two or three times lower than the duration at which the battery has been overcharged in order to compensate for the overcharge. This charge rate depends on the chemistry of the battery technology. In this the rated life of the battery is maintained or prolonged.

An improved method for multiple battery charge control has been disclosed. When a plurality of batteries are to be charged for a peak usage time period, the method in accordance with the present invention determines a priority rating for each of the batteries based upon at least one parameter. The parameter comprises a closeness to a desired charge level. A battery closer to the desired charge level is given a higher priority rating. The batteries are then charged according to their priority ratings. When the plurality of batteries are to be charged for an off-peak usage time period, the method adjusts the charge rates of the batteries based upon the parameter and the available time for the charge. In this manner, quick recharged battery availability is provided during peak usage time periods, while battery life is prolonged during off-peak usage time periods. The power efficiency of the charging station is increased as well.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for compensating for overcharging of at least one battery, comprising the steps of:
    (a) calculating a charge rate for the at least one battery;
    (b) comparing an overcharge accumulator value for the at least one battery with a maximum time limit value;

(c) comparing the calculated charge rate with a nominal charge rate for the at least one battery, if the overcharge accumulator value is less than the maximum time limit value;

(d) incrementing the overcharge accumulator value if the calculated charge rate is higher than the nominal charge rate, if the overcharge accumulator value is less than the maximum time limit value;

(e) decrementing the overcharge accumulator value if the calculated charge rate is lower than the nominal charge rate, if the overcharge accumulator value is less than the maximum time limit value;

(f) setting the charge rate for the at least one battery to the calculated charge rate, if the overcharge accumulator value is less than the maximum time limit value; and (g) setting the charge rate for the at least one battery to the nominal charge rate, or to a charge rate lower than the nominal charge rate, if the overcharge accumulator value equals or exceeds the maximum time limit value.

2. The method of claim 1, wherein the calculating step (a) comprises:

(a1) determining a status of at least one parameter for the at least one battery, wherein the at least one parameter comprises a closeness to a desired charge level;

(a2) determining if the at least one battery is to be charged during a peak usage time period or an off-peak usage time period;

(a3) calculating a peak charge schedule, if the at least one battery is to be charged during the peak usage time period, comprising:

(a3i) determining a priority rating for the at least one battery based upon the at least one parameter, wherein a battery closer to the desired charge level has a higher priority rating, and (a3ii) setting the calculated charge rate for the at least one battery based upon the priority rating for the at least one battery; and (a4) calculating an off-peak charge schedule, if the at least one battery is to be charged during the off-peak, usage time period, comprising:

(a4i) setting the calculated charge rate for the at least one battery based upon the at least one parameter and a time available for charging the at least one battery.

3. A computer readable medium with program instructions for compensating for overcharging of at least one battery, comprising the instructions for:

(a) calculating a charge rate for the at least one battery;

(b) comparing an overcharge accumulator value for the at least one battery with a maximum time limit value;

(c) comparing the calculated charge rate with a nominal charge rate for the at least one battery, if the overcharge accumulator value is less than the maximum time limit value;

(d) incrementing the overcharge accumulator value if the calculated charge rate is higher than the nominal charge rate, if the overcharge accumulator value is less than the maximum time limit value;

(e) decrementing the overcharge accumulator value if the calculated charge rate is lower than the nominal charge rate, if the overcharge accumulator value is less than the maximum time limit value;

(f) setting the charge rate for the at least one battery to the calculated charge rate, if the overcharge accumulator value is less than the maximum time limit value; and (g) setting the charge rate for the at least one battery to the nominal charge rate, or to a charge rate lower than the nominal charge rate, if the overcharge accumulator value equals or exceeds the maximum time limit value.

4. The medium of claim 3, wherein the calculating instruction (a) comprises instructions for:

(a1) determining a status of at least one parameter for the at least one battery, wherein the at least one parameter comprises a closeness to a desired charge level;

(a2) determining if the at least one battery is to be charged during a peak usage time period or an off-peak usage time period;

(a3) calculating a peak charge schedule, if the at least one battery is to be charged during the peak usage time period, comprising:

(a3i) determining a priority rating for the at least one battery based upon the at least one parameter, wherein a battery closer to the desired charge level has a higher priority rating, and (a3ii) setting the calculated charge rate for the at least one battery based upon the priority rating for the at least one battery; and (a4) calculating an off-peak charge schedule, if the at least one battery is to be charged during the off-peak, usage time period, comprising:

(a4i) setting the calculated charge rate for the at least one battery based upon the at least one parameter and a time available for charging the at least one battery.

* * * * *